(12) United States Patent
Chen et al.

(10) Patent No.: US 8,797,630 B2
(45) Date of Patent: Aug. 5, 2014

(54) DISPLAY PANEL

(71) Applicant: Au Optronics Corporation, Hsinchu (TW)

(72) Inventors: Hung-Yi Chen, Taichung (TW); Chien-Kai Chen, Taipei (TW); Chen-Hsien Liao, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/723,104

(22) Filed: Dec. 20, 2012

(65) Prior Publication Data

US 2014/0085702 A1    Mar. 27, 2014

(30) Foreign Application Priority Data

Sep. 21, 2012 (TW) .............................. 101134793 A (51) Int. Cl.
*G02B 26/00* (2006.01)
*G02F 1/03* (2006.01)
*G02F 1/133* (2006.01)

(52) U.S. Cl.
USPC .............................. 359/290; 359/245; 349/33

(58) Field of Classification Search
USPC ................. 359/290–293, 295, 223–225, 243, 359/260–263, 198, 301–303, 315–318, 237, 359/242, 276, 238, 245, 259, 244, 253–254, 359/265; 349/33
See application file for complete search history.

(56) References Cited

U.S. PATENT DOCUMENTS

| 8,120,721 | B2 | 2/2012 | Kimura |
| 2006/0061530 | A1 | 3/2006 | Yuasa |
| 2006/0103909 | A1* | 5/2006 | Benning et al. ............... 359/237 |
| 2008/0074383 | A1 | 3/2008 | Dean |
| 2008/0297030 | A1 | 12/2008 | Zhang et al. |
| 2009/0103159 | A1* | 4/2009 | Cheng et al. .................. 359/228 |
| 2010/0245408 | A1* | 9/2010 | Matsuoka et al. ............ 345/690 |

* cited by examiner

*Primary Examiner* — Dawayne A Pinkney
(74) *Attorney, Agent, or Firm* — Jianq Chyun IP Office (57) ABSTRACT

A display panel includes a first substrate, a third substrate and a second substrate disposed therebetween. A first grid structure having first openings is disposed on the first substrate to expose pixel regions. A second grid structure having second openings and a third grid structure having third openings are disposed on the second substrate and the third substrate, respectively. A first polar solution layer is disposed between the first substrate and the second substrate. A second polar solution layer is disposed between the third substrate and the second substrate. A first non-polar solution layer is disposed within the first openings. A second non-polar solution layer is disposed within the second openings. The second non-polar solution layer disposed in different pixel regions has different colors. A third non-polar solution layer is disposed within the third openings. The third non-polar solution layer disposed in different pixel regions has different colors.

16 Claims, 4 Drawing Sheets

DISPLAY PANEL

CROSS-REFERENCE TO RELATED APPLICATION

This application claims the priority benefit of Taiwan application serial no. 101134793, filed on Sep. 21, 2012. The entirety of the above-mentioned patent application is hereby incorporated by reference herein and made a part of this specification.

BACKGROUND

1. Technical Field

The invention relates to a display panel. Particularly, the invention relates to a display panel with good color saturation.

2. Related Art

In recent years, E-papers and E-books are quickly developed, and lighter, thinner and flexible displays become main products in the development trend of the future. An electro-wetting display is a display panel widely applied in the E-books and the E-papers.

A general electro-wetting display panel includes an upper electrode, a lower electrode and a polar solution layer and a non-polar solution layer disposed between the two electrodes. When a voltage is not applied to the two electrodes, the non-polar solution layer covers an entire pixel region. In this way, an incident light is absorbed by the non-polar solution layer, and the pixel region presents a dark state. Conversely, when the pixel region is to present a bright state, the voltage is applied to the upper and lower electrodes, and the non-polar solution layer is contracted to a periphery of the pixel region, and the exposed region presents a translucent state. If a reflection layer is disposed under the polar solution layer, the incident light is reflected by the reflection layer to present the bright state. If a light source is disposed under the non-polar solution layer, the light may pass through the non-polar solution layer to present the bright state.

Moreover, in order to make the electro-wetting display panel to display color images, a color dye is generally mixed in the non-polar solution layer of the electro-wetting display panel. However, if an ink of the three primary colors of RGB (red, green and blue) is used as the color non-polar solution layer, about 66% of a color conversion rate is reduced. On the other hand, if a color superposition of CYM (cyan, magenta, yellow) is used as the color non-polar solution layer, the color conversion rate is increased. However, since a color gamut of the CYM is narrow, it may cause a poor color saturation of the display panel.

SUMMARY

The invention is directed to a display panel, which has good color saturation.

The invention provides a display panel having a plurality of pixel regions. Each of the pixel regions includes a display region and a non-display region adjacent to each other. The display panel includes a first substrate, a second substrate, a third substrate, a first grid structure, a second grid structure, a third grid structure, a first polar solution layer, a second polar solution layer, a first non-polar solution layer, a second non-polar solution layer, a third non-polar solution layer, a plurality of first pixel electrodes, a plurality of second pixel electrodes, a plurality of third pixel electrodes, a first hydrophobic layer, a second hydrophobic layer, a third hydrophobic layer and a plurality of first light adjusting patterns.

The third substrate is disposed opposite to the first substrate, and the second substrate is disposed between the first substrate and the third substrate. The first grid structure is disposed on the first substrate. The first grid structure has a plurality of first openings to expose the pixel regions. The second grid structure is disposed on the second substrate. The second grid structure has a plurality of second openings to expose the pixel regions. The third grid structure is disposed on the third substrate. The third grid structure has a plurality of third openings to expose the pixel regions. The first polar solution layer is disposed between the first substrate and the second substrate. The second polar solution layer is disposed between the third substrate and the second substrate. The first non-polar solution layer is disposed between the first substrate and the first polar solution layer, and is disposed in the first openings. The second non-polar solution layer is disposed between the second substrate and the second polar solution layer, where the second non-polar solution layer disposed in two adjacent pixel regions has different colors. The third non-polar solution layer is disposed between the third substrate and the second polar solution layer, and the second polar solution layer separates the second non-polar solution layer and the third non-polar solution layer, where the third non-polar solution layer disposed in two adjacent pixel regions has different colors.

The first pixel electrodes are disposed on the first substrate. The first pixel electrodes are located in the display regions, and regions between the display regions and the first grid structure define the non-display regions. The second pixel electrodes are disposed between the second substrate and the second non-polar solution layer. The second pixel electrodes are located in the display regions of the pixel regions, and located corresponding to the first pixel electrodes. The third pixel electrodes are disposed between the third substrate and the third non-polar solution layer. The third pixel electrodes are located in the display regions of the pixel regions, and located corresponding to the first pixel electrodes. The first hydrophobic layer is disposed on the first substrate to cover the first pixel electrodes. The second hydrophobic layer is disposed on the second substrate to cover the second pixel electrodes. The third hydrophobic layer is disposed on the third substrate to cover the third pixel electrodes. The first light adjusting patterns are disposed on the first substrate, and each of the first light adjusting patterns is located in the non-display region of one of the pixel regions.

According to the above descriptions, the display panel of the invention has three layers of the non-polar solution layer, where the first non-polar solution layer is packaged between the first substrate and the second substrate, and the second non-polar solution layer and the third non-polar solution layer are both packaged between the second substrate and the third substrate. The second non-polar solution layer corresponding to different pixel regions may have different colors, and the third non-polar solution layer corresponding to different pixel regions may have different colors. Moreover, the second non-polar solution layer and the third non-polar solution layer corresponding to the same pixel region may have the same color. In this way, color saturation of a displayed light is increased through the second non-polar solution layer and the third non-polar solution layer located in the same pixel region.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
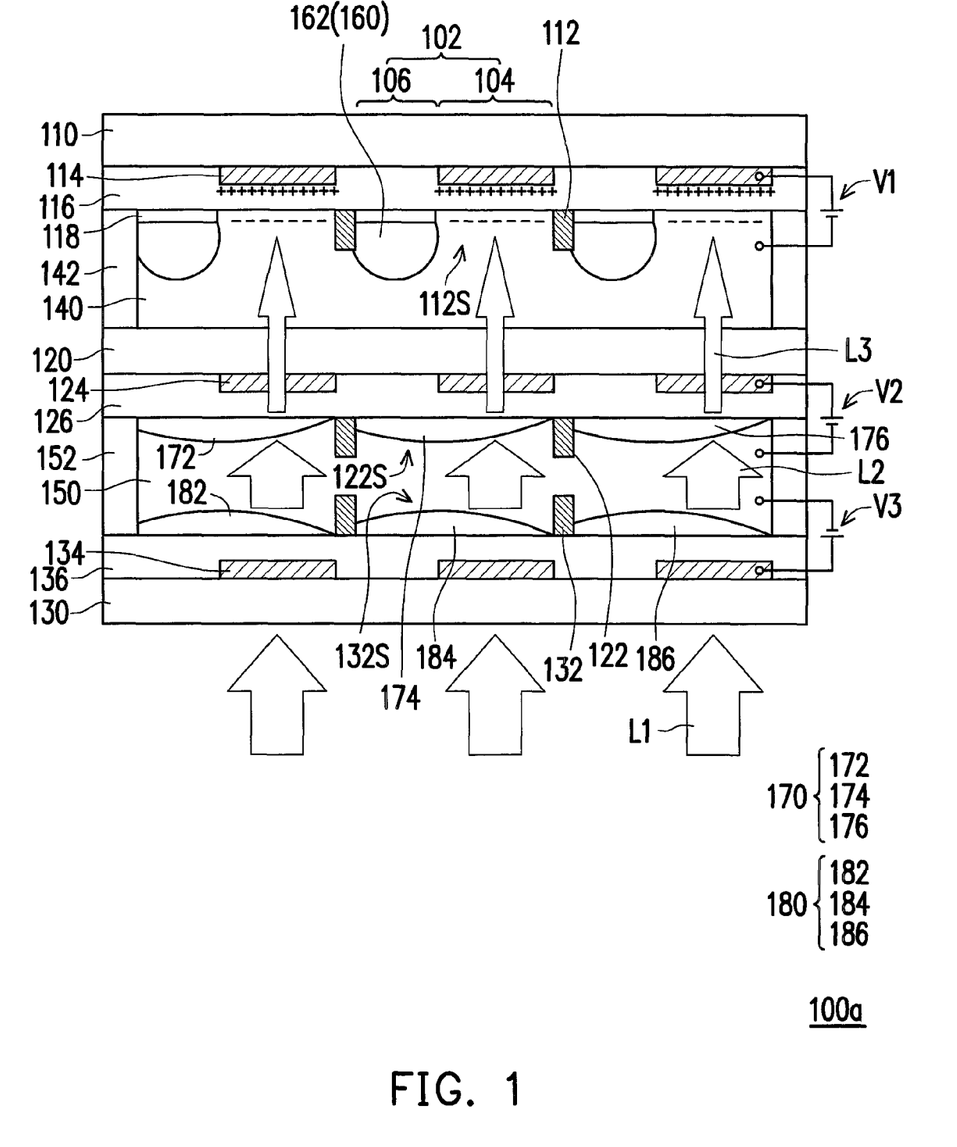
FIG. 1 is a cross-sectional view of a display panel according to an embodiment of the invention.

FIG. 1 is a cross-sectional view of a display panel according to an embodiment of the invention. Referring to FIG. 1, the display panel 100a of the present embodiment has a plurality of pixel regions 102. Each of the pixel regions 102 includes a display region 104 and a non-display region 106 adjacent to each other. The display panel 100a includes a first substrate 110, a second substrate 120, a third substrate 130, a first grid structure 112, a second grid structure 122, a third grid structure 132, a first polar solution layer 140, a second polar solution layer 150, a first non-polar solution layer 160, a second non-polar solution layer 170, a third non-polar solution layer 180, a plurality of first pixel electrodes 114, a plurality of second pixel electrodes 124, a plurality of third pixel electrodes 134, a first hydrophobic layer 116, a second hydrophobic layer 126, a third hydrophobic layer 136 and a plurality of first light adjusting patterns 118.

In the present embodiment, the third substrate 130 is disposed opposite to the first substrate 110, and the second substrate 120 is disposed between the first substrate 110 and the third substrate 130. The first grid structure 112 is disposed on the first substrate 110. In the present embodiment, the first grid structure 112 has a plurality of first openings 112S, where each of the first openings 112S is configured corresponding to one of the pixel regions 102 to expose the pixel region 102. The second grid structure 122 is configured on the second substrate 120. In the present embodiment, the second grid structure 122 has a plurality of second openings 122S, where each of the second openings 122S is disposed corresponding to first opening 112S to expose the pixel region 102. The third grid structure 132 is configured on the second substrate 130. In the present embodiment, the third grid structure 132 has a plurality of third openings 132S, where each of the third openings 132S is disposed corresponding to the first opening 112S to expose the pixel region 102.

The first polar solution layer 140 is disposed between the first substrate 110 and the second substrate 120. The first polar solution layer 140 is, for example, water or other polar solutions, for example, an electrolyte solution. The display panel 100a further includes a first sidewall 142 disposed between the first substrate 110 and the second substrate 120. The first sidewall 142 surrounds the first polar solution layer 140 to seal the first polar solution layer 140 in the display panel 100a.

The second polar solution layer 150 is disposed between the third substrate 130 and the second substrate 120. The second polar solution layer 150 is, for example, water or other polar solutions, for example, an electrolyte solution. The display panel 100a further includes a second sidewall 152 disposed between the second substrate 120 and the third substrate 130. The second sidewall 152 surrounds the second polar solution layer 150 to seal the second polar solution layer 150 in the display panel 100a.

The first non-polar solution layer 160 is disposed between the first substrate 110 and the first polar solution layer 140. In the present embodiment, the first non-polar solution layer 160 includes a plurality of black droplets 162, and the black droplets 162 are respectively disposed in the first openings 1125. Moreover, the first grid structure 112 can provide a barrier effect to prevent the first non-polar solution layer 160 from spilling to the adjacent pixel region 102.

The second non-polar solution layer 170 is disposed between the second substrate 120 and the second polar solution layer 150. In the present embodiment, the second non-polar solution layer 170 includes at least a first color droplet 172, at least a second color droplet 174 and at least a third color droplet 176. The first color droplet 172, the second color droplet 174 and the third color droplet 176 are respectively located in different second openings 122S and have different colors, so that the second non-polar solution layer 170 disposed in two adjacent pixel regions 102 has different colors. Moreover, the second grid structure 122 has a sufficient height to prevent the second non-polar solution layer 170 from spilling to the adjacent pixel region 102 to cause staining.

The third non-polar solution layer 180 is disposed between the third substrate 130 and the second polar solution layer 150. In the present embodiment, the third non-polar solution layer 180 includes at least a fourth color droplet 182, at least a fifth color droplet 184 and at least a sixth color droplet 186. Since the fourth color droplet 182, the fifth color droplet 184 and the sixth color droplet 186 are respectively located in different third openings 132S and have different colors, the third non-polar solution layer 180 disposed in two adjacent pixel regions 102 has different colors. Moreover, the third grid structure 132 has a sufficient height to prevent the third non-polar solution layer 180 from spilling to the adjacent pixel region 102 to cause staining.

In the present embodiment, the first color droplet 172 and the fourth color droplet 182 are located in the same pixel region 102. Namely, the first color droplet 172 and the fourth color droplet 182 are overlapped to each other along a thickness direction of the display panel 100a. Moreover, the first color droplet 172 and the fourth color droplet 182 have the same color and may have different color saturations. In other words, the first color droplet 172 and the fourth color droplet 182 can be red non-polar droplets with the same concentration or different concentrations.

Similarly, the second color droplet 174 and the fifth color droplet 184 are located in the same pixel region 102 and have the same color. Moreover, the second color droplet 174 and the fifth color droplet 184 may have different color saturations. In other words, the second color droplet 174 and the fifth color droplet 184 can be green non-polar droplets with the same concentration or different concentrations.

Similarly, the third color droplet 176 and the sixth color droplet 186 are located in the same pixel region 102 and have the same color. Moreover, the third color droplet 176 and the sixth color droplet 186 may have different color saturations. In other words, the third color droplet 176 and the sixth color droplet 186 can be blue non-polar droplets with the same concentration or different concentrations.

Certainly, the invention is not limited to the colors of the first color droplet 172, the second color droplet 174 and the third color droplet 176. The colors presented by the first color droplet 172, the second color droplet 174 and the third color droplet 176 can be a combination of red, green and blue or a combination of other colors.

Moreover, the second polar solution layer 150 separates the second non-polar solution layer 170 and the third non-polar solution layer 180. In detail, since the second polar solution layer 150 has a polarity and is immiscible with the second non-polar solution layer 170 and the third non-polar solution layer 180 having no polarity, the second polar solution layer 150 can prevent a mutual contact between the second non-polar solution layer 170 and the third non-polar solution layer 180 to cause staining.

The first pixel electrodes 114 are disposed on the first substrate 110, and are located in the display regions 104 of the pixel regions 102. Now, regions between the display regions 104, i.e. the areas of the pixel electrodes 114, and the first grid structure 112 can be defined as the non-display regions 106. Moreover, the second pixel electrodes 124 are disposed between the second substrate 120 and the second non-polar solution layer 170, and the second pixel electrodes 124 are located in the display regions 104 of the pixel regions 102, and located corresponding to the first pixel electrodes 114. Moreover, the third pixel electrodes 134 are disposed between the third substrate 130 and the third non-polar solution layer 180, and the third pixel electrodes 134 are located in the display regions 104 of the pixel regions 102, and located corresponding to the first pixel electrodes 114. It should be noticed that in the present embodiment, the so-called "one device is located corresponding to another device" means that the two devices are mutually overlapped along the thickness direction of the display panel 100a, where the overlap includes a partial overlap or a complete overlap.

The first hydrophobic layer 116 is disposed on the first substrate 110 to cover the first pixel electrodes 114, and the first hydrophobic layer 116 is located between the first pixel electrodes 114 and the first non-polar solution layer 160. In detail, the first hydrophobic layer 116 is hydrophobic, which avails keeping contacting the first non-polar solution layer 160.

The second hydrophobic layer 126 is disposed on the second substrate 120 to cover the second pixel electrodes 124, and the second hydrophobic layer 126 is located between the second pixel electrodes 124 and the second non-polar solution layer 170. In detail, the second hydrophobic layer 126 is hydrophobic, which avails keeping contacting the second non-polar solution layer 170.

The third hydrophobic layer 136 is disposed on the third substrate 130 to cover the third pixel electrodes 134, and the third hydrophobic layer 136 is located between the third pixel electrodes 134 and the third non-polar solution layer 180. In detail, the third hydrophobic layer 136 is hydrophobic, which avails keeping contacting the third non-polar solution layer 180.

In the present embodiment, the first pixel electrodes 114 can be driven by a first driving voltage V1 to control an affinity between the first polar solution layer 140 and the first hydrophobic layer 116. Similarly, the second pixel electrodes 124 and the third pixel electrodes 134 can be respectively driven by a second driving voltage V2 and a third driving voltage V3 to control affinities between the second polarity solution layer 150 and the second hydrophobic layer 126 and between the second polarity solution layer 150 and the third hydrophobic layer 136.

Regarding control of a non-polar solution layer, when a driving voltage is not applied to the electrode, an affinity between the non-polar solution layer and a hydrophobic layer is greater than an affinity between a polar solution layer and the hydrophobic layer, such that the non-polar solution layer can be distributed on a surface of the hydrophobic layer. Moreover, when the driving voltage is applied to the electrode, a surface of the hydrophobic layer has a charge distribution, and the affinity between the polar solution layer and the hydrophobic layer is increased. Now, the non-polar solution layer is pushed to a region without the electrode (the non-display region 106). The display panel 100a display frames through the above method.

Regarding the embodiment of FIG. 1, the first driving voltage V1 is applied to the first pixel electrodes 114, and none driving voltage is applied to the second pixel electrodes 124 and the third pixel electrodes 134 (or the third driving voltage V3 and the second driving voltage V2 are zero). Therefore, the black droplets 162 of the first non-polar solution layer 160 concentrate in the non-display regions 106 to expose the display regions 104. Moreover, the second non-polar solution layer 170 is, for example, distributed on a whole surface of the second hydrophobic layer 126, and the third non-polar solution layer 180 is, for example, distributed on a whole surface of the third hydrophobic layer 136. Therefore, when the display panel 100a is a transmissive display panel, a first light L1 can pass through the third non-polar solution layer 180 to form a first color light L2. The first color light L2 further passes through the second non-polar solution layer 170 to form a second color light L3.

In a same pixel region 102, the droplets of the second non-polar solution layer 170 and the third non-polar solution layer 180 have a same color. Therefore, regarding the light passes through the same pixel region 102, as the second color light L3 passes through both of the non-polar solution layers 170 and 180, a color saturation thereof is higher than that of the first color light L2. Therefore, the frame presented by the display panel 100a may have high color saturation.

Moreover, in order to achieve the effect of displaying different colors, the driving method of the second pixel electrodes 124 and the third pixel electrodes 134 in the display panel 100a is not limited thereto, and in other embodiments, the second driving voltage V2 applied to the second pixel electrodes 124 can be controlled to concentrate the second non-polar solution layer 170 in the non-display regions 106 due to increase of the affinity between the second polar solution layer 150 and the second hydrophobic layer 126. Namely, by adjusting a magnitude of the second driving voltage V2, the second non-polar solution layer 170 can be completely or partially located in the non-display regions 106, so as to completely or partially expose the corresponding display regions 104. In this way, the second non-polar solution layer 170 can expose the corresponding display regions 104, and the first light L1 can only passes through the third non-polar solution layer 180 to display the required color.

Similarly, by controlling the third driving voltage V3 applied to the third pixel electrodes 134, the third non-polar solution layer 180 can be concentrated in the non-display regions 106 to expose the corresponding display regions 104. Namely, by adjusting a magnitude of the third driving voltage V3, the third non-polar solution layer 180 can be completely or partially located in the non-display regions 106, so as to completely or partially expose the corresponding display regions 104. In this way, the third non-polar solution layer 180 can expose the corresponding display regions 104, and the first light L1 can only passes through the second non-polar solution layer 170 to display the required color.

Moreover, in the present embodiment, when the driving voltage is not applied to the first pixel electrodes 114, the first non-polar solution layer 160 is distributed on the whole surface of the first hydrophobic layer 116 and covers the entire pixel regions 102. Since the first non-polar solution layer 160 includes a plurality of black droplets 162 and covers the entire pixel regions 102, the display panel 100a may present a good dark state frame.

In order to improve the quality of the display panel 100a, the first light adjusting patterns 118 can be configured in the non-display regions 106. In detail, in the present embodiment, when the user views a frame displayed by the display panel 100a, for example, the user faces to the first substrate 110, i.e. the first substrate 110 is one of the three substrates that is the closest to the user. Now, the first light adjusting patterns 118 are, for example, light-shielding patterns, and a material thereof is, for example, a light-absorbing material. Therefore, usage of the first light adjusting patterns 118 may reduce a probability that a leakage light at peripheral of the display region 104 influences the quality of the display frame.

Referring to FIG. 1, the display panel 100a of the present embodiment is, for example, a transmissive display panel, where the first light L1, for example, enters the display panel 100a from the third substrate 130, and emits out from the first substrate 110. However, the invention is not limited thereto.

Figure 2:
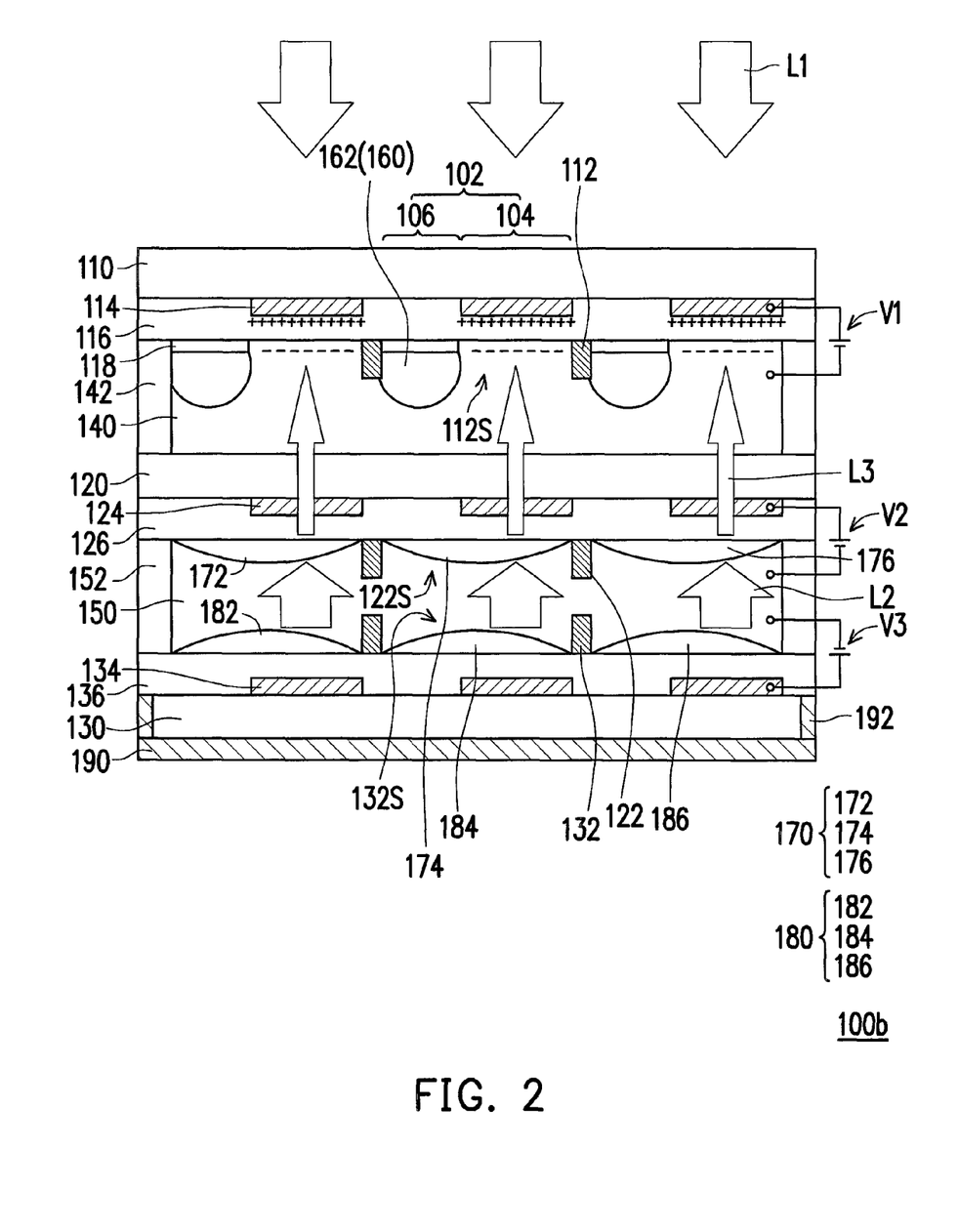
FIG. 2 is a cross-sectional view of a display panel according to another embodiment of the invention.

FIG. 2 is a cross-sectional view of a display panel according to another embodiment of the invention. It should be noticed that reference numbers of the components and a part of contents of the aforementioned embodiment are also used in the following embodiment, where the same reference numbers denote the same or like components, and descriptions of the same technical contents are omitted. The aforementioned embodiment can be referred for descriptions of the omitted parts, so that detailed descriptions thereof are not repeated in the following embodiment.

Referring to FIG. 2, a structure of the display panel 100b is similar to that of the display panel 100a, and differences therebetween are described below. First, the display panel 100b further includes a reflection layer 190. The reflection layer 190 is disposed at a side of the third substrate 130 away from the third pixel electrodes 134. In other words, the reflection layer 190 and the third pixel electrodes 134 are respectively located at two opposite sides of the third substrate 130. When the first light L1 enters the display panel 100b from the first substrate 110, the first light L1 can be reflected by the reflection layer 190 and transmitted to the third non-polar solution layer 180. Moreover, the display panel 100b may further include a plurality of reflection devices 192 disposed at two side edges of the third substrate 130, which are used to prevent the light from emitting out of the display panel 100b from the two side edges of the third substrate 130.

In the present embodiment, the display panel 100b is a reflective display panel, where the first light L1, for example, enters the display panel 100b from the first substrate 110, and emits out from the first substrate 110. In detail, after the first light L1 is reflected by the reflection layer 190, it passes through the third non-polar solution layer 180 to form a first color light L2. The first color light L2 further passes through the second non-polar solution layer 170 to form a second color light L3. Moreover, the aforementioned first light L1 is, for example, provided by an environmental light or a front light source, though the invention is not limited thereto.

Figure 3:
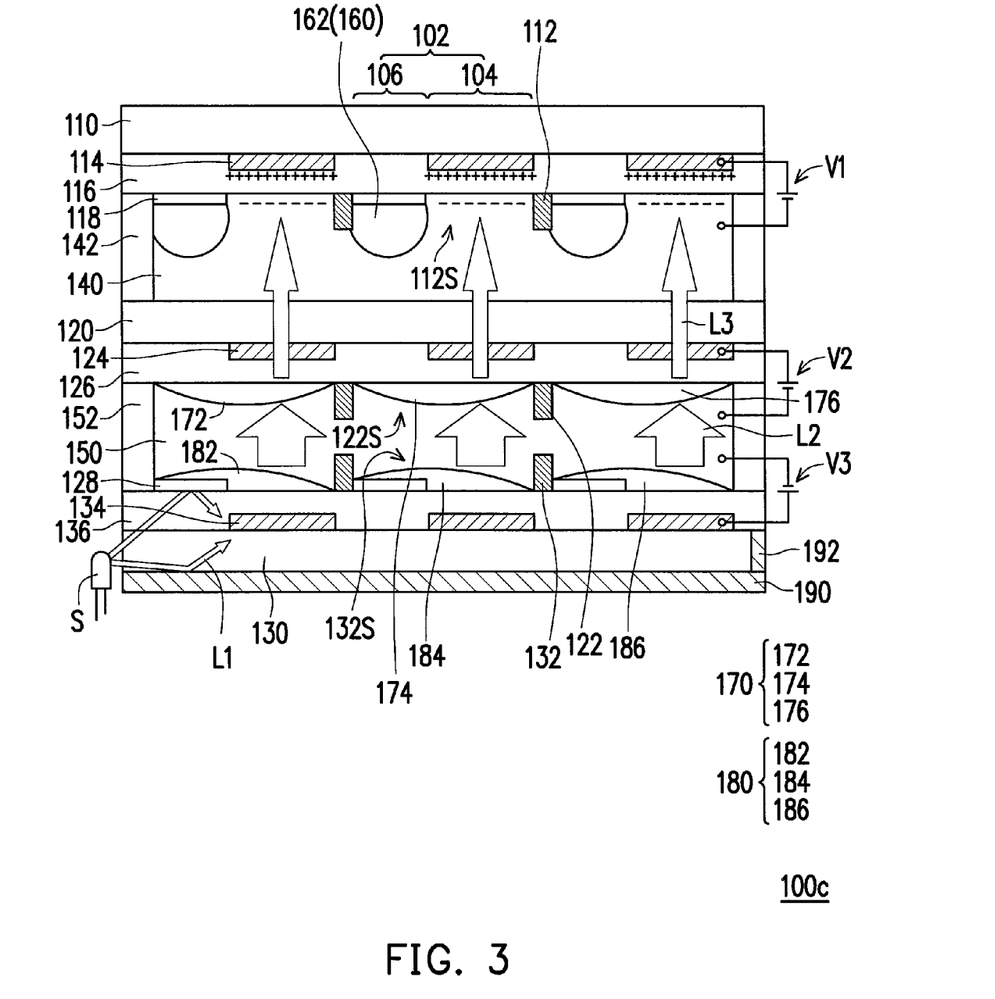
FIG. 3 is a cross-sectional view of a display panel according to still another embodiment of the invention.

FIG. 3 is a cross-sectional view of a display panel according to still another embodiment of the invention. Referring to FIG. 3, a structure of the display panel 100c is similar to that of the display panel 100a, and a main difference therebetween is that the display panel 100c further includes a light source S, and the first light L1 is, for example, provided by the light source S. In detail, the light source S is located beside the third substrate 130, and the reflection layer 190 can reflect the first light L1 provided by the light source S and transmit the same to the third substrate 130, where the third substrate 130 is, for example, a light guide plate, which is used to improve distribution evenness of the first light L1, though the invention is not limited thereto. Moreover, the display panel 100c can also include a reflection device 192 disposed at a side edge of the third substrate 130 away from the light source S, which is used to prevent the light from emitting out from the side edge of the third substrate 130.

In the present embodiment, the display panel 100c further includes a plurality of second light adjusting patterns 128. The second light adjusting patterns 128 are, for example, reflection patterns, or a refractive index of the second light adjusting pattern 128 is greater than that of the third hydrophobic layer 136. In this way, the second light adjusting patterns 128 can reflect the first light L1 back to the reflection layer 190 and the reflection layer 190 can further reflect the reflected first light L1 into the third non-polar solution layer 180 to further improve a usage rate of the first light L1. In the present embodiment, the first light adjusting patterns 118 are made of a light absorbing material, for example, a black matrix (BM), and the second light adjusting patterns 128 are made of a reflective material, for example, aluminium metal.

In the present embodiment, the display panel 100c is a reflective display panel. After the first light L1 is reflected by the reflection layer 190, it passes through the third non-polar solution layer 180 to form the first color light L2. The first color light L2 further passes through the second non-polar solution layer 170 to form the second color light L3.

Figure 4:
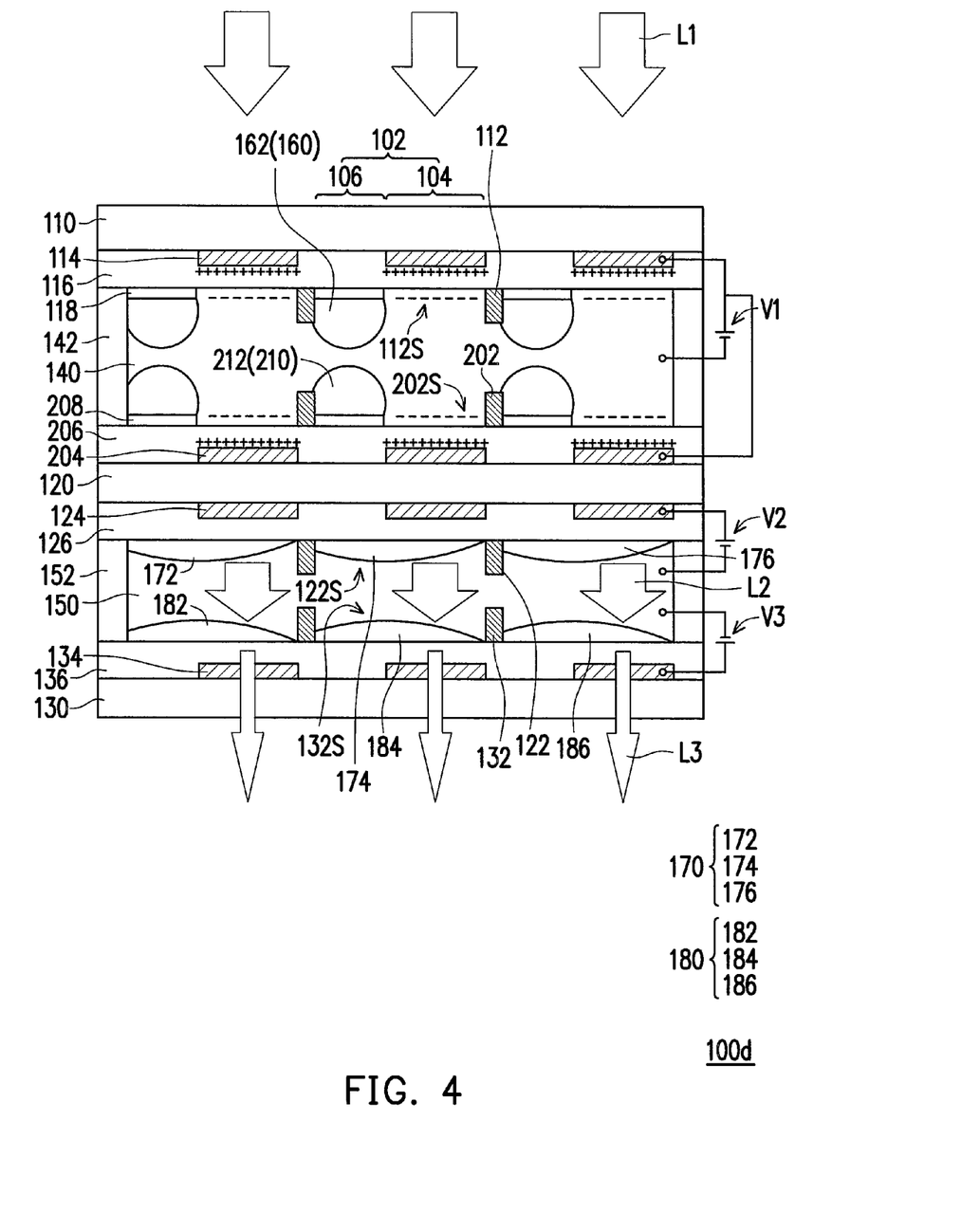
FIG. 4 is a cross-sectional view of a display panel according to yet another embodiment of the invention.

FIG. 4 is a cross-sectional view of a display panel according to yet another embodiment of the invention. Referring to FIG. 4, a structure of the display panel 100d of the present embodiment is similar to that of the display panel 100a, and differences therebetween are described below. The display panel 100d further includes a fourth grid structure 202, a plurality of fourth pixel electrodes 204, a fourth hydrophobic layer 206 and a fourth non-polar solution layer 210.

The fourth grid structure 202 is disposed between the second substrate 120 and the first polar solution layer 140, and the fourth grid structure 202 has a plurality of fourth openings 202S. The fourth openings 202S exposes the pixel regions 102. The fourth pixel electrodes 204 are disposed between the second substrate 120 and the first polar solution layer 140, and the fourth pixel electrodes 204 are located in the display regions 104 of the pixel regions 102 and located corresponding to the first pixel electrodes 114. The fourth hydrophobic layer 206 is disposed on the second substrate 120 to cover the fourth pixel electrodes 204. The fourth non-polar solution layer 210 is disposed between the fourth hydrophobic layer 206 and the first polar solution layer 140. In the present embodiment, the fourth non-polar solution layer 210 includes a plurality of black droplets 212 located in the fourth openings 202S.

According to the double-layer design of the first non-polar solution layer 160 and the fourth non-polar solution layer 210, when the black droplets 162 and the black droplets 212 are simultaneously tiled on the whole surfaces of the first hydrophobic layer 116 and the fourth hydrophobic layer 206, the display panel 100d may have desirable dark state display effect. Moreover, similar to the aforementioned embodiment, the display panel 100d may also have the high color saturation through the design of the second non-polar solution layer 170 and the third non-polar solution layer 180.

In the present embodiment, the display panel 100d is a transmissive display panel, the first light L1, for example, enters the display panel 100d from the first substrate 110, and emits out from the third substrate 130. In detail, the first light L1 passes through the second non-polar solution layer 170 to form the first color light L2. The first color light L2 further passes through the third non-polar solution layer 180 to form the second color light L3.

Moreover, the display panel 100d further includes a plurality of third light adjusting patterns 208. The third light adjusting patterns 208 are, for example, light-shielding patterns, and a material thereof is, for example, a light-absorbing material. Therefore, usage of the third light adjusting patterns 208 may reduce a probability that the leakage light at peripheral of the display region 104 influences the quality of the display frame.

In summary, in the display panel of the invention, the second non-polar solution layer and the third non-polar solution layer located in adjacent pixel regions have different colors. Moreover, the second non-polar solution layer and the third non-polar solution layer located in the same pixel region may have the same color and different color saturations. Therefore, the color saturation presented by the light passing through the same pixel region can be adjusted according to different requirements. Moreover, the first non-polar solution layer composed of the black droplets can provide good dark state effect to the display panel.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display panel, having a plurality of pixel regions, each of the pixel regions comprising a display region and a non-display region adjacent to each other, and the display panel comprising:
    a first substrate;
    a second substrate;
    a third substrate, disposed opposite to the first substrate, wherein the second substrate is disposed between the first substrate and the third substrate;
    a first grid structure, disposed on the first substrate, and having a plurality of first openings to expose the pixel regions;
    a second grid structure, disposed on the second substrate, and having a plurality of second openings to expose the pixel regions;
    a third grid structure, disposed on the third substrate, and having a plurality of third openings to expose the pixel regions, wherein the second grid structure and the third grid structure are facing toward each other;
    a first polar solution layer, disposed between the first substrate and the second substrate;
    a second polar solution layer, disposed between the third substrate and the second substrate;
    a first non-polar solution layer, disposed between the first substrate and the first polar solution layer, and disposed in the first openings;
    a second non-polar solution layer, disposed between the second substrate and the second polar solution layer, wherein the second non-polar solution layer disposed in two adjacent pixel regions has different colors, wherein the second non-polar solution layer comprises at least a first color droplet, at least a second color droplet and at least a third color droplet, the first color droplet, the second color droplet and the third color droplet are respectively located in different second openings and have different colors;
    a third non-polar solution layer, disposed between the third substrate and the second polar solution layer, and the second polar solution layer separates the second non-polar solution layer and the third non-polar solution layer, wherein the third non-polar solution layer disposed in two adjacent pixel regions has different colors, wherein the third non-polar solution layer comprises at least a fourth color droplet, at least a fifth color droplet and at least a sixth color droplet, the fourth color droplet, the fifth color droplet and the sixth color droplet are respectively located in different third openings and have different colors, wherein the first color droplet and the fourth color droplet are located in a same pixel region, have a same color, and have different color saturations, the second color droplet and the fifth color droplet are located in a same pixel region have a same color, and have different color saturations, and the third color droplet and the sixth color droplet are located in a same pixel region have a same color, and have different color saturations;
    a plurality of first pixel electrodes, disposed on the first substrate, and located in the display regions, wherein regions between the display regions and the first grid structure define the non-display regions;
    a plurality of second pixel electrodes, disposed between the second substrate and the second non-polar solution layer, located in the display regions of the pixel regions, and located corresponding to the first pixel electrodes;
    a plurality of third pixel electrodes, disposed between the third substrate and the third non-polar solution layer, located in the display regions of the pixel regions, and located corresponding to the first pixel electrodes;
    a first hydrophobic layer, disposed on the first substrate to cover the first pixel electrodes;
    a second hydrophobic layer, disposed on the second substrate to cover the second pixel electrodes;
    a third hydrophobic layer, disposed on the third substrate to cover the third pixel electrodes; and
    a plurality of first light adjusting patterns, disposed on the first substrate, wherein each of the first light adjusting patterns is located in the non-display region of one of the pixel regions.

2. The display panel as claimed in claim 1, wherein the first light adjusting patterns are a plurality of light-shielding patterns.

3. The display panel as claimed in claim 1, further comprising a reflection layer disposed at a side of the third substrate away from the third pixel electrodes, and disposed opposite to the third pixel electrodes.

4. The display panel as claimed in claim 3, further comprising at least one reflection device disposed at a side edge of the third substrate, and disposed adjacent to the reflection layer.

5. The display panel as claimed in claim 3, further comprising a light source disposed beside the third substrate, wherein the reflection layer reflects a light provided by the light source to the third substrate.

6. The display panel as claimed in claim 5, further comprising a plurality of second light adjusting patterns disposed on the third substrate, wherein each of the second light adjusting patterns is located in the non-display region of a corresponding pixel region.

7. The display panel as claimed in claim 6, wherein the second light adjusting patterns are a plurality of reflection patterns.

8. The display panel as claimed in claim 6, wherein a refractive index of the second light adjusting patterns is greater than a refractive index of the third hydrophobic layer.

9. The display panel as claimed in claim 5, further comprising at least one reflection device disposed at a side edge of the third substrate, and disposed adjacent to the reflection layer.

10. The display panel as claimed in claim 5, wherein the third substrate comprises a light guide plate.

11. The display panel as claimed in claim 1, wherein the first non-polar solution layer comprises a plurality of black droplets located in the first openings.

12. The display panel as claimed in claim 1, wherein under a driving state, at least a part of the first non-polar solution layer is located in the corresponding non-display regions, and partially exposes the corresponding display regions.

13. The display panel as claimed in claim 1, wherein under a driving state, at least a part of the second non-polar solution layer is located in the corresponding non-display regions, and partially exposes the corresponding display regions.

14. The display panel as claimed in claim 1, further comprising:
 a fourth grid structure, disposed between the second substrate and the first polar solution layer, wherein the fourth grid structure has a plurality of fourth openings to expose the pixel regions;
 a plurality of fourth pixel electrodes, disposed between the second substrate and the first polar solution layer, located in the display regions of the pixel regions, and located corresponding to the first pixel electrodes;
 a fourth hydrophobic layer, disposed on the second substrate to cover the fourth pixel electrodes; and
 a fourth non-polar solution layer, disposed between the fourth hydrophobic layer and the first polar solution layer.

15. The display panel as claimed in claim 14, wherein the fourth non-polar solution layer comprises a plurality of black droplets located in the fourth openings.

16. The display panel as claimed in claim 1, wherein the first hydrophobic layer is located between the first pixel electrodes and the first non-polar solution layer, the second hydrophobic layer is located between the second pixel electrodes and the second non-polar solution layer, and the third hydrophobic layer is located between the third pixel electrodes and the third non-polar solution layer.

* * * * *